(12) United States Patent
Umana

(10) Patent No.: US 9,219,876 B1
(45) Date of Patent: Dec. 22, 2015

(54) TELEVISION MONITOR AND MICROWAVE OVEN COMBINATION

(75) Inventor: Roberto A. Umana, Gretna, LA (US)

(73) Assignee: Roberto A. Umana, Gretna, LA (US)

(*) Notice: Subject to any disclaimer, the term of this patent is extended or adjusted under 35 U.S.C. 154(b) by 94 days.

(21) Appl. No.: 12/813,576

(22) Filed: Jun. 11, 2010

(51) Int. Cl.
  *H05B 6/64* (2006.01)
  *H04N 5/64* (2006.01)

(52) U.S. Cl.
  CPC .................................... *H04N 5/64* (2013.01)

(58) Field of Classification Search
  USPC .................................. 219/601, 678, 679, 680
  See application file for complete search history.

(56) References Cited

U.S. PATENT DOCUMENTS

| | | |
|---|---|---|
| 4,580,754 A | 4/1986 | Hughes |
| 4,628,351 A | 12/1986 | Heo |
| D439,794 S | 4/2001 | Paul |
| 6,853,399 B1 | 2/2005 | Gilman et al. |
| 7,155,923 B2 | 1/2007 | Nam et al. |
| 7,476,828 B2 * | 1/2009 | Genua ........................ 219/679 |
| 7,869,201 B2 * | 1/2011 | McCoy et al. ........... 361/679.07 |
| 2002/0080273 A1 | 6/2002 | Harrison et al. |

\* cited by examiner

*Primary Examiner* — Quoc Hoang

(57) ABSTRACT

A television monitor and microwave oven combination includes a microwave oven that with a housing having a top wall, a bottom wall, a rear wall, a first lateral wall, a second lateral wall and a front wall. The front wall has an opening therein to allow positioning of food items access an interior of the housing. A door is hingedly coupled to the first lateral wall. A first lateral edge of the door is positioned adjacent to the first lateral wall of the housing. The door is positionable in a closed position covering the opening or in an open position exposing the opening. A display monitor is mounted on the microwave oven to allow viewing of video on the display monitor. A signal conduit is electrically coupled to the display monitor. The signal conduit includes an input port mounted on the housing.

11 Claims, 3 Drawing Sheets

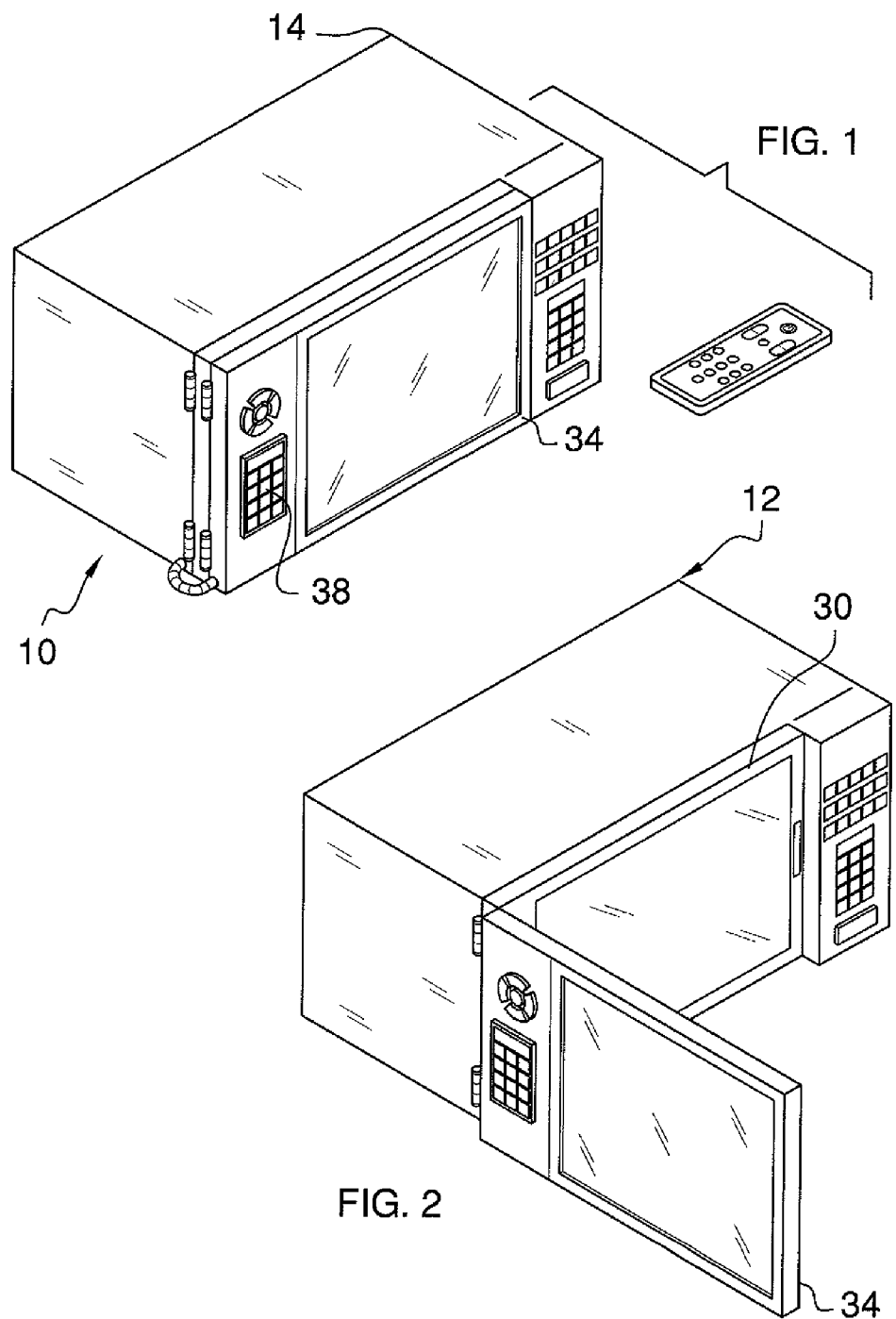

TELEVISION MONITOR AND MICROWAVE OVEN COMBINATION

BACKGROUND OF THE DISCLOSURE

Field of the Disclosure

The disclosure relates to food cooking device and display monitor combination devices and more particularly pertains to a new food cooking device and display monitor combination device for allowing a person to view video on a microwave oven.

SUMMARY OF THE DISCLOSURE

An embodiment of the disclosure meets the needs presented above by generally comprising a microwave oven that includes a housing having a top wall, a bottom wall, a rear wall, a first lateral wall, a second lateral wall and a front wall. The front wall has an opening therein to allow positioning of food items access an interior of the housing. A door is hingedly coupled to the first lateral wall. A first lateral edge of the door is positioned adjacent to the first lateral wall of the housing. The door is positionable in a closed position covering the opening or in an open position exposing the opening. A display monitor is mounted on the microwave oven to allow viewing of video on the display monitor. A signal conduit is electrically coupled to the display monitor. The signal conduit includes an input port mounted on the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a top perspective view of a television monitor and microwave oven combination according to an embodiment of the disclosure.

FIG. 2 is a top perspective view of an embodiment of the disclosure.

DESCRIPTION OF THE PREFERRED EMBODIMENT

Figure 3:
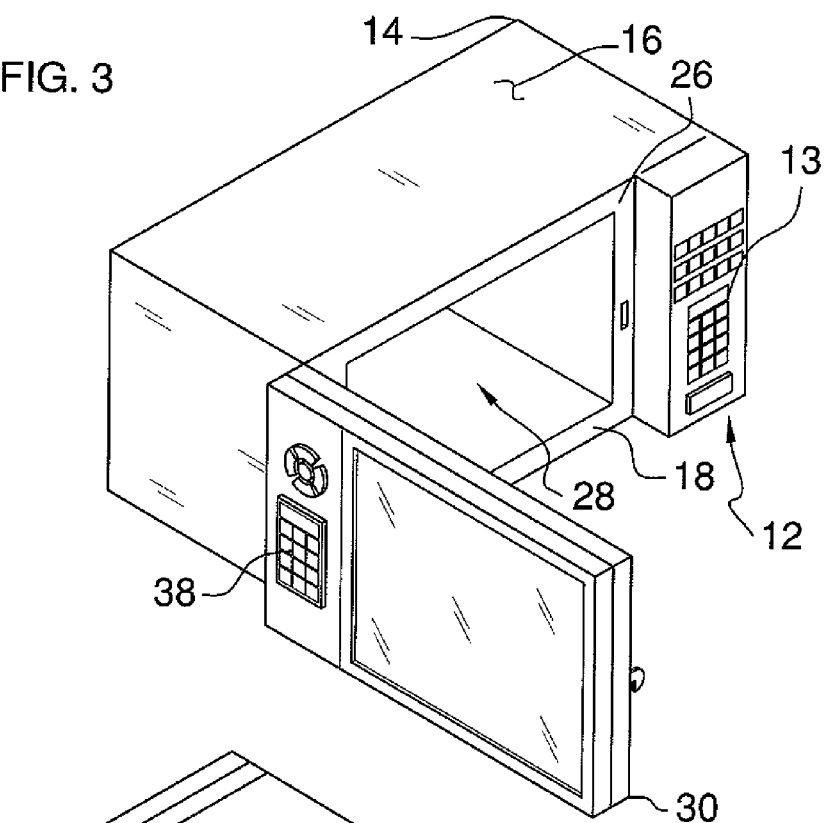
FIG. 3 is a top perspective view of an embodiment of the disclosure.
Figure 4:
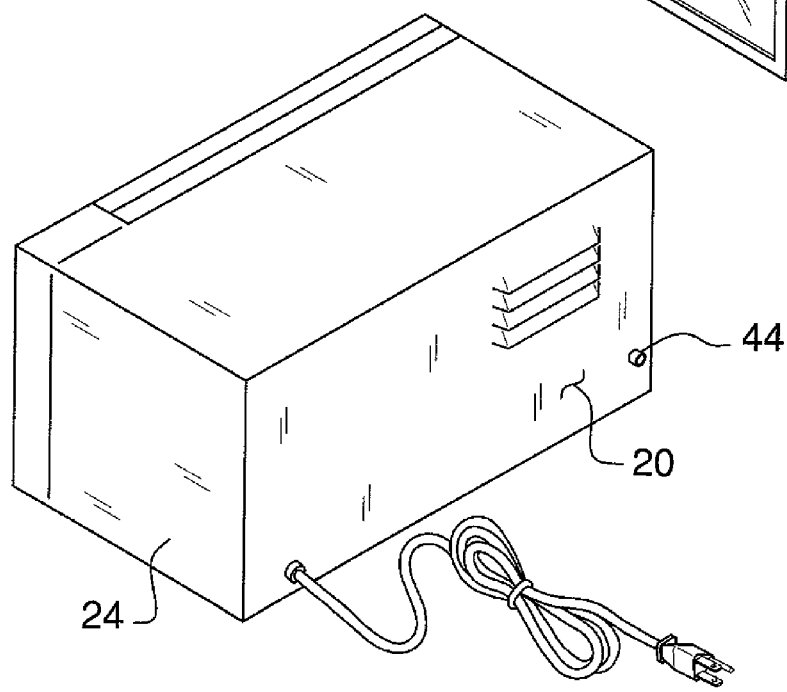
FIG. 4 is a rear perspective view of an embodiment of the disclosure.
Figure 5:
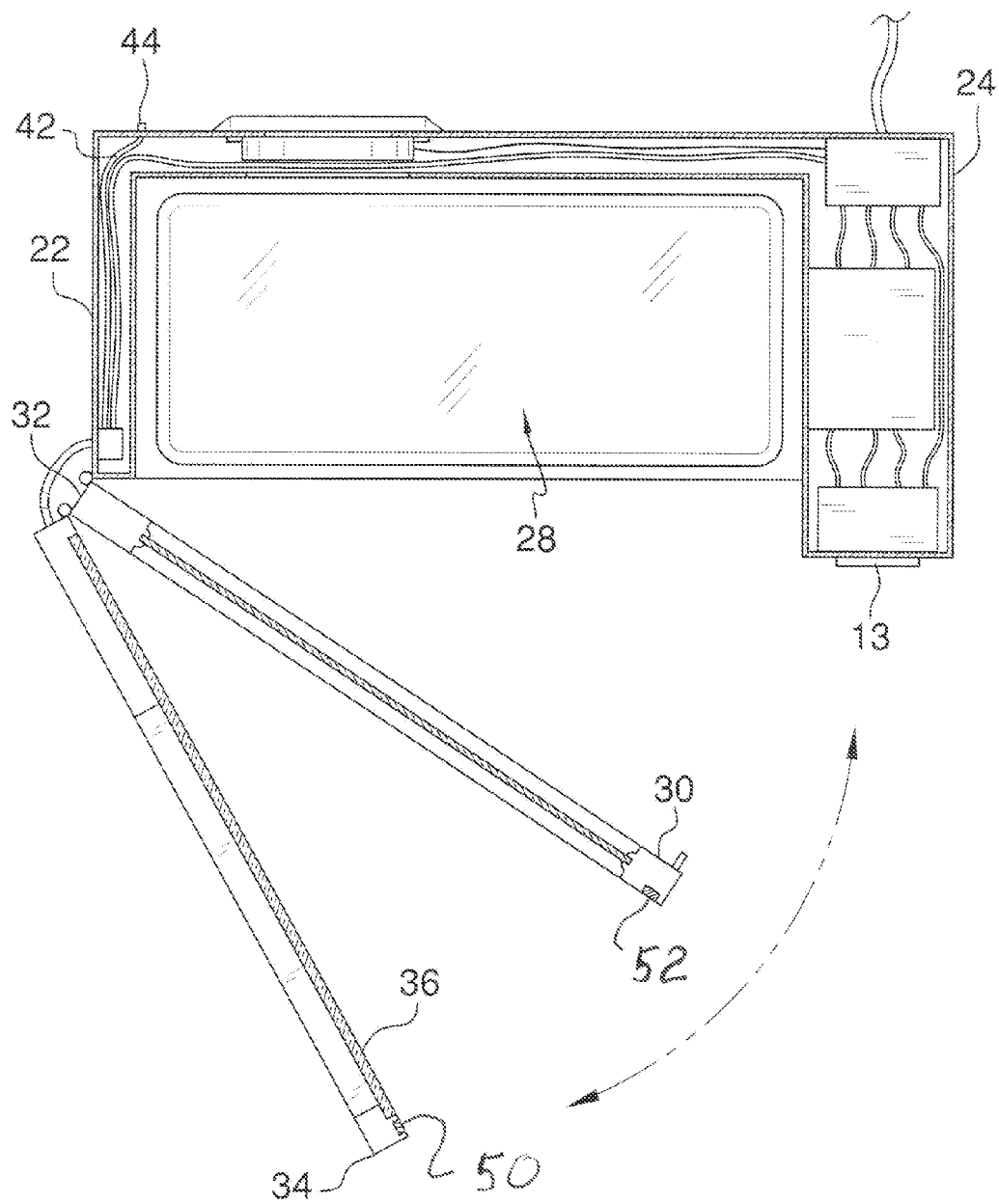
FIG. 5 is a top cross-sectional view of an embodiment of the disclosure.

With reference now to the drawings, and in particular to FIGS. 1 through 5 thereof, a new food cooking device and display monitor combination device embodying the principles and concepts of an embodiment of the disclosure and generally designated by the reference numeral 10 will be described.

As best illustrated in FIGS. 1 through 5, the television monitor and microwave oven combination 10 generally comprises a conventional microwave oven 12 that includes a housing 14 having a top wall 16, a bottom wall 18, a rear wall 20, a first lateral wall 22, a second lateral wall 24 and a front wall 26. The front wall 26 has an opening 28 therein to allow positioning of food items access an interior of the housing 14. A door 30 is hingedly coupled to the first lateral wall 22 and a first lateral edge 32 of the door 30 is positioned adjacent to the first lateral wall 22 of the housing 14. The door 30 is positionable in a closed position covering the opening 28 or in an open position exposing the opening 28.

A display monitor 34 is mounted on the microwave oven 12 to allow viewing of video on the display monitor 34. The display monitor 34 is conventional and may include a viewing screen 36, a plurality of input actuators 38 thereon to selective determine video to be displayed on the display monitor, a tuner for processing audio and video signals and one or more speakers for emitting sound processed from the audio signals. The display screen 36 may include any type of conventional viewing screen such as a liquid crystal display or an organic light-emitting diode display. As with most display monitors, the display monitor 34 may also include a wireless remote control 40 to turn the display monitor 34 on or off, select between a plurality of television channels, and adjusting volume output. The door 30 is preferably inset into the housing 14 so that the display monitor 34 is flush with a control panel 13 of the microwave oven 12.

The display monitor 34 is mounted on the door 30 and more particularly may be hingedly coupled to the door 30 at a position adjacent to the first lateral edge 32 of the door 30 to allow the display monitor 34 to be pivoted outwardly from the door 30 in a deployed position or abutted against the door 30 in a stored position. The viewing screen 36 may face the door 30 when the display monitor 34 is in the stored position, or the viewing screen may face outwardly from the door 30. A securing member is mounted on the display monitor 34 and housing 14 to releasably secure the display monitor 34 in the stored position. The securing member includes a first mating member 50 mounted on the display monitor 34 and a second mating member 52 mounted on the housing 14. The first 50 and second 52 mating members may include a magnet and a magnetically active material.

At least one signal conduit 42 is electrically coupled to the display monitor 34. The signal conduit 42 includes an input port 44 that is mounted on the housing 14. The signal conduit 42 transfers video and audio signals from a signal output to the display monitor 34.

In use, the microwave oven 12 is used in a conventional manner to heat food items. The display monitor 34 allows a person to view television programming, or video from any conventional video output device, and also allows the person to adjust the angle of the display monitor 34 relative to the housing 14 for easier viewing of the display monitor 34. The combination 10 allows for the positioning of a display monitor 34 in a location that is typically convenient for viewing while also allowing a person to see through the door 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A television viewer and cooking appliance combination assembly comprising:
    a microwave oven including a housing having a top wall, a bottom wall, a rear wall, a first lateral wall, a second lateral wall and a front wall, said front wall having an opening therein to allow positioning of food items access an interior of said housing, a door being hingedly coupled to said first lateral wall, a first lateral edge of said door being positioned adjacent to said first lateral wall of said housing, said door being positionable in a closed position covering said opening or in an open position exposing said opening;
    a display monitor being mounted on said microwave oven to allow viewing of video on said display monitor, said display monitor being hingedly coupled to said door at a position adjacent to said first lateral edge of said door to allow said display monitor to be pivoted outwardly from said door in a deployed position or abutted against said door in a stored position, said door having a front face being covered by said display monitor when said display monitor is in said stored position, said display monitor completely covering said front face when said display monitor is in said stored position; and
    a signal conduit being electrically coupled to said display monitor, said signal conduit including an input port, said input port being mounted on said housing.

2. The assembly according to claim 1, wherein said display monitor is mounted on said door.

3. The assembly according to claim 1, wherein said display monitor includes a viewing screen facing said door when said display monitor is in said stored position.

4. The assembly according to claim 1, further including a securing member being mounted on said display monitor and said housing to releasably secure said display monitor in said stored position.

5. The assembly according to claim 4, wherein said securing member includes a first mating member mounted on said display monitor and a second mating member mounted on said housing, one of said first or second mating members including a magnet and another of said first or second mating members comprising a magnetically active material.

6. A television viewer and cooking appliance combination assembly comprising:
    a microwave oven including a housing having a top wall, a bottom wall, a rear wall, a first lateral wall, a second lateral wall and a front wall, said front wall having an opening therein to allow positioning of food items access an interior of said housing, a door being hingedly coupled to said first lateral wall, a first lateral edge of said door being positioned adjacent to said first lateral wall of said housing, said door being positionable in a closed position covering said opening or in an open position exposing said opening;
    a display monitor being mounted on said microwave oven to allow viewing of video on said display monitor, said display monitor being mounted on said door, said display monitor being hingedly coupled to said door at a position adjacent to said first lateral edge of said door to allow said display monitor to be pivoted outwardly from said door in a deployed position or abutted against said door in a stored position, said display monitor including a plurality of input actuators thereon to selective determine video to be displayed on said display monitor, said display monitor including a viewing screen facing said door when said display monitor is in said stored position;
    a signal conduit being electrically coupled to said display monitor, said signal conduit including an input port, said input port being mounted on said housing; and
    a securing member being mounted on said display monitor and said housing to releasably secure said display monitor in said stored position.

7. The assembly according to claim 6, wherein said securing member includes a first mating member mounted on said display monitor and a second mating member mounted on said housing, one of said first or second mating members including a magnet and another of said first or second mating members comprising a magnetically active material.

8. A television viewer and cooking appliance combination assembly comprising:
    a microwave oven including a housing having a top wall, a bottom wall, a rear wall, a first lateral wall, a second lateral wall and a front wall, said front wall having an opening therein to allow positioning of food items access an interior of said housing, a door being hingedly coupled to said first lateral wall, a first lateral edge of said door being positioned adjacent to said first lateral wall of said housing, said door being positionable in a closed position covering said opening or in an open position exposing said opening;
    a display monitor being mounted on said microwave oven to allow viewing of video on said display monitor, said display monitor being hingedly coupled to said door at a position adjacent to said first lateral edge of said door to allow said display monitor to be pivoted outwardly from said door in a deployed position or abutted against said door in a stored position;
    a securing member being mounted on said display monitor and said housing to releasably secure said display monitor in said stored position; and
    a signal conduit being electrically coupled to said display monitor, said signal conduit including an input port, said input port being mounted on said housing.

9. The assembly according to claim 8, wherein said display monitor is mounted on said door.

10. The assembly according to claim 8, wherein said display monitor includes a viewing screen facing said door when said display monitor is in said stored position.

11. The assembly according to claim 8, wherein said securing member includes a first mating member mounted on said display monitor and a second mating member mounted on said housing, one of said first or second mating members including a magnet and another of said first or second mating members comprising a magnetically active material.

* * * * *